United States Patent [19]

Naimpally

[11] Patent Number: 5,430,487
[45] Date of Patent: Jul. 4, 1995

[54] METHOD AND APPARATUS FOR IMPROVING TEMPORAL VIDEO SIGNAL PROCESSING USING MOTION VECTORS TRANSMITTED WITH THE VIDEO SIGNAL

[75] Inventor: Saiprasad V. Naimpally, Langhorne, Pa.

[73] Assignee: Matsushita Electric Corporation of America, Secaucus, N.J.

[21] Appl. No.: 954,508

[22] Filed: Sep. 30, 1992

[51] Int. Cl.⁶ .......................................... H04N 11/06
[52] U.S. Cl. ................................. 348/429; 348/474; 348/475; 348/493; 348/488; 348/699
[58] Field of Search ................... 358/141, 12, 11, 140, 358/105, 23; H04N 7/04, 11/06, 7/137, 7/13; 348/402, 407, 416, 429, 473, 474, 475, 488, 493, 624, 699

[56] References Cited

U.S. PATENT DOCUMENTS

| | | | |
|---|---|---|---|
| 4,660,072 | 4/1987 | Fukinuki | 358/12 |
| 4,661,850 | 4/1987 | Strolle | 358/12 |
| 4,665,437 | 5/1987 | Nicholson | 358/148 |
| 4,723,161 | 2/1988 | Koga | 348/402 |
| 4,864,403 | 9/1989 | Chao et al. | 358/167 |
| 4,888,641 | 12/1989 | Isnardi et al. | 358/141 |
| 4,901,149 | 2/1990 | Fernando | 358/141 |
| 4,984,078 | 1/1991 | Skinner | 358/12 |
| 4,985,769 | 1/1991 | Yasumoto et al. | 358/141 |
| 5,001,550 | 3/1991 | Hurst | 358/141 |
| 5,005,078 | 4/1991 | Gillard | 358/140 |
| 5,043,808 | 8/1991 | Knauer | 358/141 |
| 5,053,857 | 10/1991 | Sandbank | 358/141 |
| 5,083,206 | 1/1992 | Knauer | 358/141 |
| 5,184,219 | 2/1993 | Cho | 358/12 |

FOREIGN PATENT DOCUMENTS

| | | | |
|---|---|---|---|
| 241285 | 9/1990 | Japan | H04N 7/137 |
| 296479 | 12/1990 | Japan | H04N 7/137 |

OTHER PUBLICATIONS

E. Dubois & S. Sabri, "Noise Reduction in Image Sequences Using Motion-Compensated Temporal Filtering," IEEE Transactions on Communications, vol. COM-32, No. 7, pp. 826-831 (Jul., 1984).
S. Inoue et al., "Encoding and Decoding in the 6-MHz NTSC-Compatible Widescreen Television System," IEEE Transactions on Circuits and Systems for Video Technology, vol. 1, No. 1, pp. 49-57 (Mar., 1991).
S. Naimpally et al., "Integrated Digital IDTV Receiver with Features," IEEE Trans. on Consumer Electronics, vol. 34, No. 3, pp. 410-419 (Aug., 1988).
Y. Yasumoto et al., "An Extended Definition Televison System Using Quadrature Modulation of the Video Carrier with Inverse Nyquist Filter," IEEE Trans. on Consumer Electronics, vol. CE-33, No. 3, pp. 173-180 (Aug. 1987).
J. L. Lim, "Two-Dimensional Signal and Image Processing," Prentice-Hall, Englewood Cliffs, N.J., 1990 edition, pp. 497-498, 507-511, 570-575.
Mischa Schwartz, "Information Transmission, Modulation, and Noise", *McGraw-Hill*, pp. 224-235 (1980).
"IEEE Standard Dictionary of Electrical and Electronics Terms—Fourth Edition", *IEEE*, p. 763 (1990).

*Primary Examiner*—James J. Groody
*Assistant Examiner*—Chris Grant
*Attorney, Agent, or Firm*—Ratner & Prestia

[57] ABSTRACT

A system for improving motion-sensitive processing in a television receiver generates motion vectors for video images in a studio environment, encodes the motion vectors and then combines the encoded motion vectors with the video signal for transmission. A receiver decodes the motion vectors and applies them to the motion-sensitive processing apparatus to improve its performance. The motion vector information is encoded during the active portion of the video signal in a manner that does not produce significant distortion when the video signal is processed for display. According to one embodiment of the invention, the motion vectors are encoded in a band of frequencies surrounding the color subcarrier signal as a 16 quadrature amplitude modulated (QAM) signal using Fukinuki-type modulation. According to another embodiment of the invention the motion vectors are encoded using conventional 16 QAM modulation and then used to modulate a carrier signal which is quadrature phase related to the picture carrier signal.

5 Claims, 15 Drawing Sheets

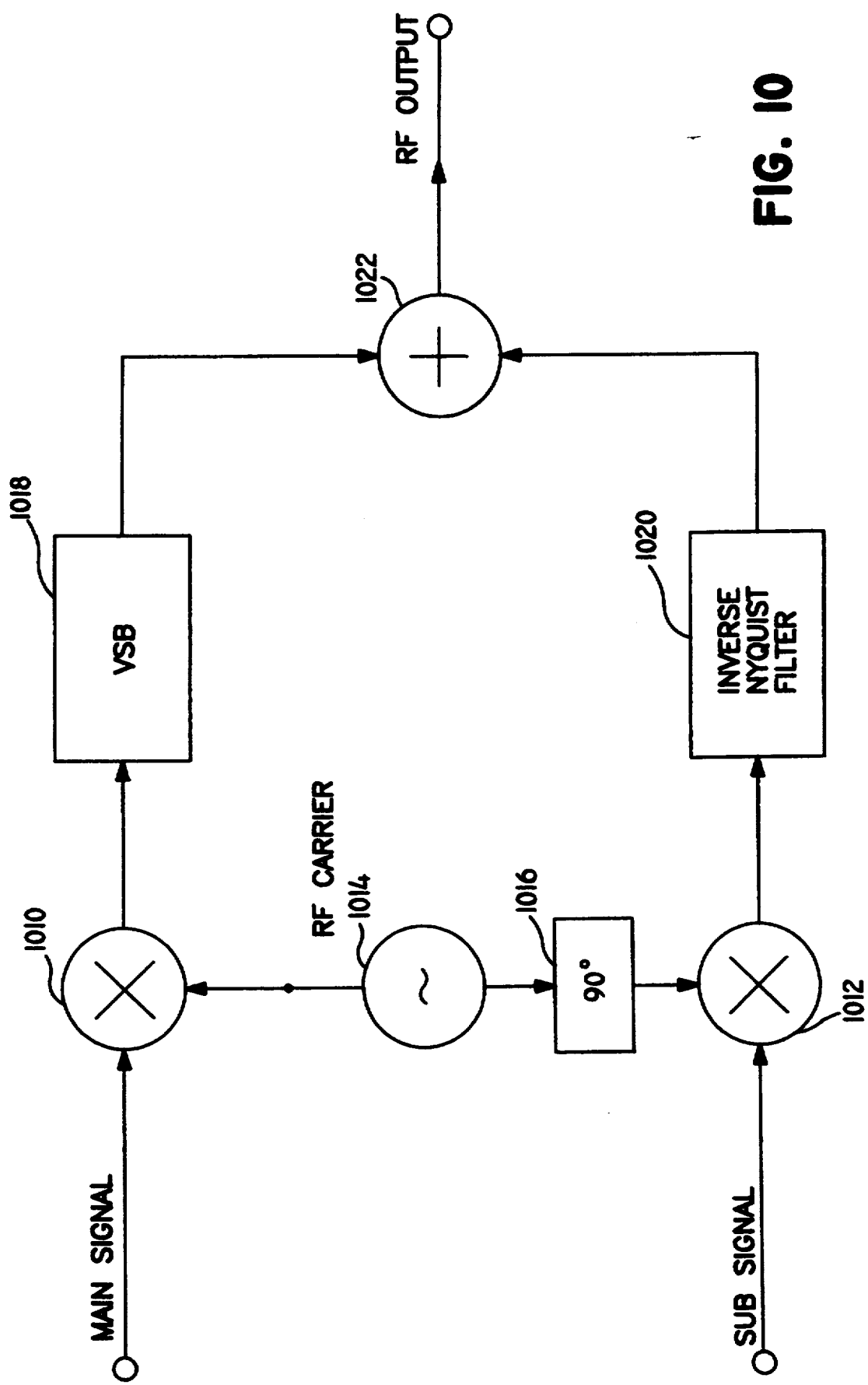

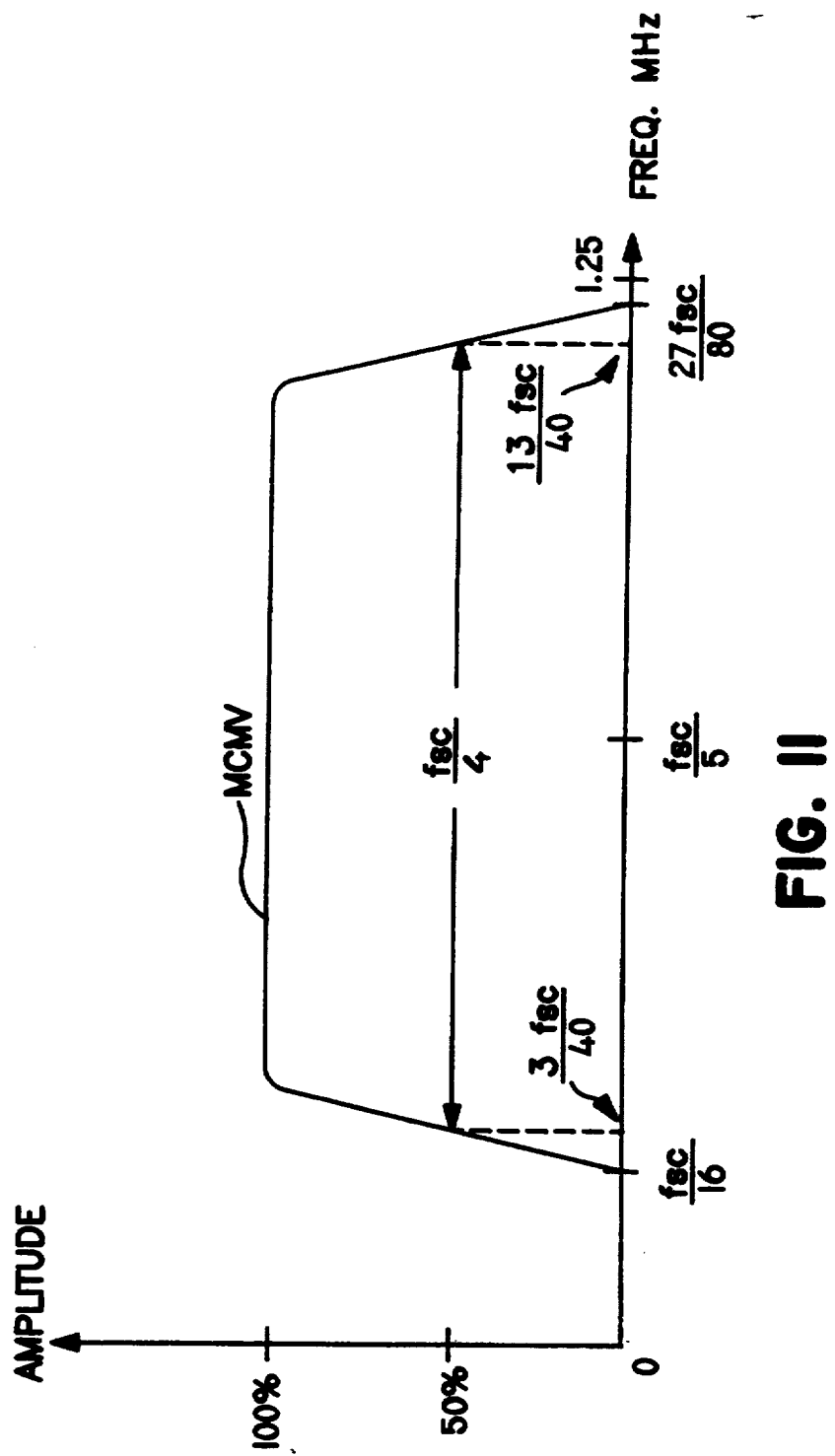

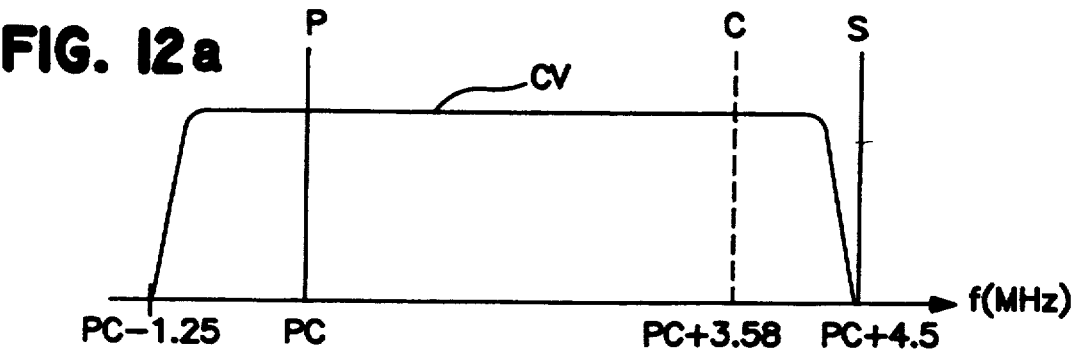
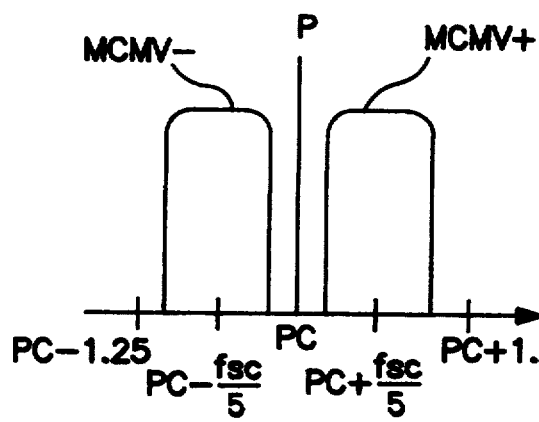
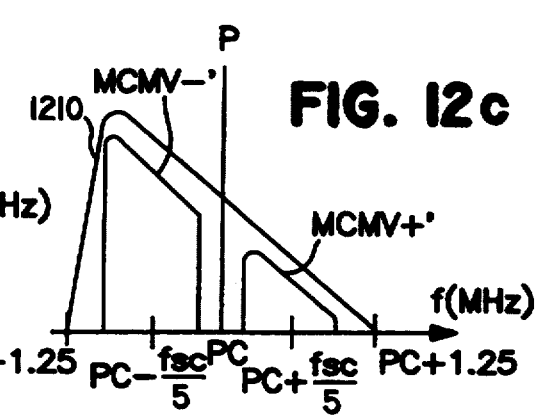
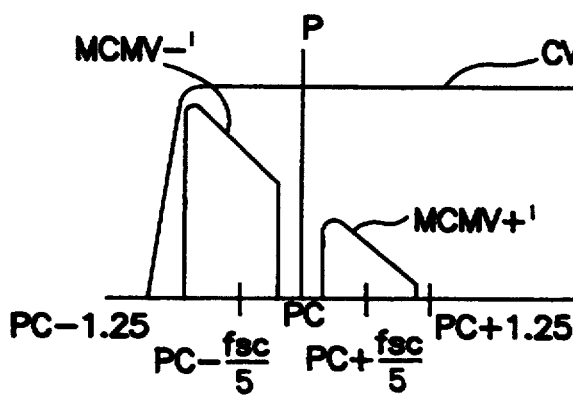
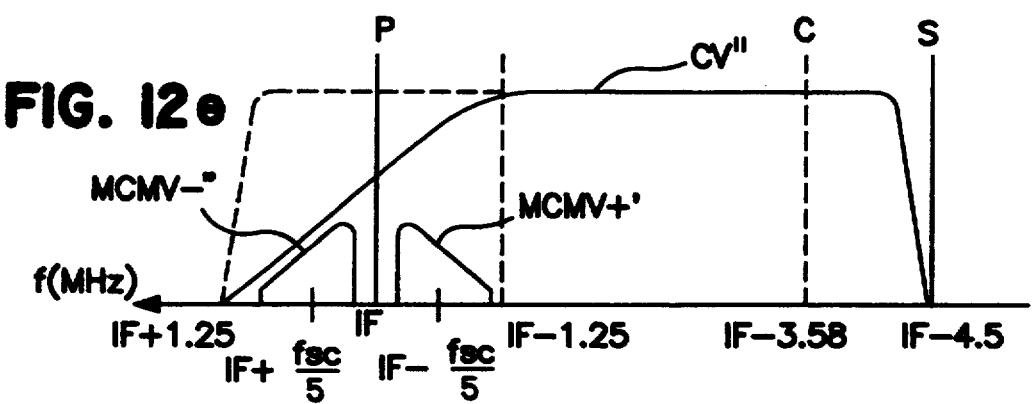

METHOD AND APPARATUS FOR IMPROVING TEMPORAL VIDEO SIGNAL PROCESSING USING MOTION VECTORS TRANSMITTED WITH THE VIDEO SIGNAL

BACKGROUND OF THE INVENTION

The present invention relates to apparatus and a method for enhancing the temporal processing of video signals which are received via a transmission channel and, in particular, to a system which imperceptibly encodes motion vectors in the transmitted signal which are then decoded at the receiver and used to enhance temporal processing of the received video signals.

Television receivers which use frame or field memories to improve the quality of images reproduced from a television signal are well known. One example of a system of this type is described in U.S. Pat. No. 4,665,437 entitled ADAPTIVE FIELD OR FRAME STORE PROCESSOR, which is hereby incorporated by reference for its teachings on video signal processing. The system described in this patent applies a frame comb filter or a line comb filter to separate the luminance and chrominance components of a received video signal. The line comb filter is used whenever time-base errors are detected in the received signal. Otherwise, the frame comb filter is used. This patent also describes a progressive scan system which switches between inter-field and intra-field systems responsive to time-base errors.

Another television system which uses temporal processing to enhance the quality of reproduced images is described in a paper by S. Naimpally et al. entitled "Integrated Digital IDTV Receiver With Features" *IEEE Transactions on Consumer Electronics*, Vol. 34, No. 3, August, 1988, pp 410–419, which is hereby incorporated by reference for its teachings on video signal processing.

The system described in the referenced paper employs a recursive temporal filter containing a frame delay element to reduce the level of noise in the reproduced image. An exemplary filter, of the type employed in the referenced paper, is shown in FIG. 1. In this Figure, the received luminance signal is applied to one input port of a subtracter 110, the other input port of which is coupled to receive a frame-delayed video signal from a frame delay element 122. The subtracter 110 subtracts the received signal from the delayed signal and applies the result to a scaling circuit 112. The scaling circuit multiplies the difference signal by a value K, which is changed in response to the magnitude of the difference between the previous frame and the current frame (i.e. motion in the underlying images).

The scaled difference signal is added, by a summing circuit 114, to the frame delayed signal provided by the delay element 122. The output signal of the summing circuit is the output signal of the temporal filtering system. This signal is also stored in the frame delay element 122 for use in processing video signals during the next successive frame interval.

The value of K is determined by applying the difference signal developed by the subtracter 110 to a low-pass filter 116 and then taking the absolute value of the low-pass filtered signal in a rectifying circuit 118. This filtered and rectified signal is applied as address values to a read-only memory (ROM) 120. The ROM 120 contains a look-up table (LUT) which specifies the value of K as a function of the rectified difference between the luminance signals in the current and previous frames. FIG. 2 is a graphical depiction of an exemplary function that may be stored in the ROM 120.

As shown in FIG. 2, K has a relatively small value (e.g. $\frac{1}{8}$) when the difference between the current and previous frames is small (i.e. no motion) and a relatively large value (e.g. 1) when the difference between the current and previous frames is large.

The level of noise reduction in decibels (dB), NR, which may be achieved by the circuitry shown in FIG. 1 is given in the equation (1).

$$NR = 10 \log_{10}((2-K)/K) \tag{1}$$

While the system described above is a motion adaptive noise reduction filter, other types of motion adaptive processors, for example, frame/field/line comb filters for separating the luminance and chrominance signal components, and intra-field/inter-field progressive scan systems, for reducing the visibility of image artifacts caused by the raster scan, may also be made motion-adaptive. In each of these systems, signals representing relatively still areas of the image are processed in longer time frames while signals representing moving areas of the image are processed in shorter time frames.

The problem with all simple motion adaptive processors of the type described above, is that there is a noticeable loss of picture quality in moving areas of the image while there is a significant improvement in still areas. In the case of noise reduction, if the K factor is not increased sufficiently for moving areas, the picture appears smeared in those areas and the edges of moving objects may appear blurred. If, however, the K factor is increased to be close to its maximum value, noise may appear in areas of moving detail, such as along the edges of moving objects. Motion artifacts of this type are also apparent in motion-adaptive interlace to progressive scan converters and motion-adaptive comb filters.

Significant improvement in performance can be obtained by using motion compensated processing instead of motion adaptive processing. Exemplary motion compensated systems are described in a paper by E. Dubois et al. entitled "Noise Reduction in Image Sequences Using Motion Compensated Temporal Filtering," *IEEE Transactions on Communications*, Vol. COM-32, No. 7, July 1984, pp 826–831 and in a section of a book by J. S. Lim entitled *Two-Dimensional Signal and Image Processing* Prentice-Hall Englewood Cliffs N.J., 1990, pp 497–498, 507–511, and 570–575. These references are hereby incorporated by reference for their teachings on motion-compensated video signal processing.

In a typical motion-compensated system, a received video image is divided into blocks of, for example, eight-by-eight pixels and each block is compared to the previous frame to find a similar set of pixels from that frame which most closely matches the block. A motion vector is associated with the block, indicating the displacement of the matching block from the previous frame.

During noise reduction processing, this matching block is provided by a frame memory in response to the block from the current image. With reference to FIG. 1, the motion block designated by the motion vector for the current block of the input signal is read from the frame memory 122 and applied to the subtracter 110 and adder 114 as the current block is processed. This operation results in temporal processing in the direction of motion. Images produced from these motion-compensated temporally processed signals exhibit greatly improved noise reduction even on moving pictures.

While it is technically possible to incorporate motion-compensated processing of this type in a consumer television receiver, at present, the cost associated with such a system would be very high. Accurate motion estimation requires a full search over a relatively large region of the previous frame. For real-time processing, a relatively large number of fast processors and a relatively large memory would be needed to calculate motion vectors of the type described in the above-referenced paper and book.

SUMMARY OF THE INVENTION

The present invention is embodied in a system which generates motion vectors for video signals while processing them for transmission. These motion vectors are then imperceptibly encoded with the video signal which is transmitted through a channel. The motion vectors are decoded from the received signal and used to implement a motion-compensated process.

According to one aspect of the invention, the system includes apparatus for calculating and transmitting, with the video signals, motion vectors for blocks of the image represented by the signals. The receivers include apparatus which decodes the motion vectors and applies them to a motion compensated image processor.

According to another aspect of the invention, the transmitted motion vectors are coarse motion vectors and the receiver includes apparatus for searching relatively small areas from the previous frame to convert each of the coarse motion vectors into a fine motion vector.

According to yet another aspect of the invention, the motion vectors are encoded using Fukinuki-type modulation and are transmitted during the active portion of the video signal.

According to another aspect of the invention, the motion vectors are encoded by modulating a signal which is in a quadrature-phase relationship with the picture carrier signal.

BRIEF DESCRIPTION OF THE DRAWINGS

FIG. 10 is a block diagram of a quadrature modulator suitable for use with the second embodiment of the invention.

FIG. 11 and FIGS. 12a, 12b, 12c, 12d and 12e are graphs of amplitude versus frequency which are useful for describing the operation of the second embodiment of the invention.

DETAILED DESCRIPTION

Figure 1:
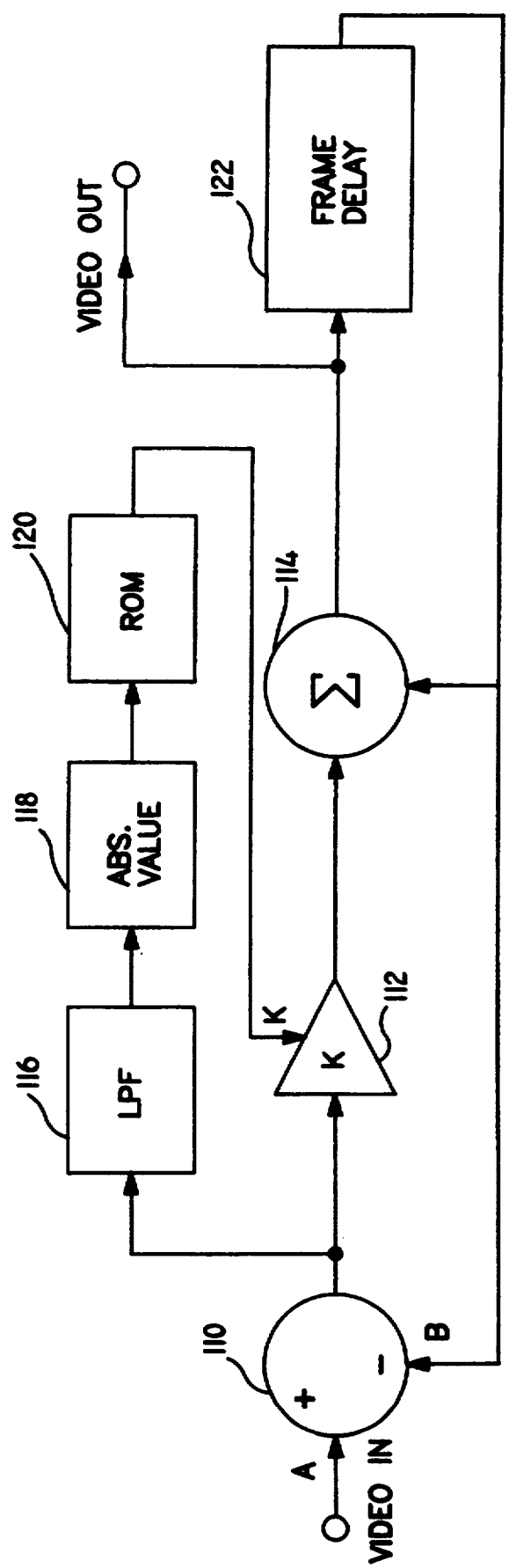
FIG. 1 (prior art) is a block diagram of a motion-adaptive video noise reduction processor.
Figure 2:
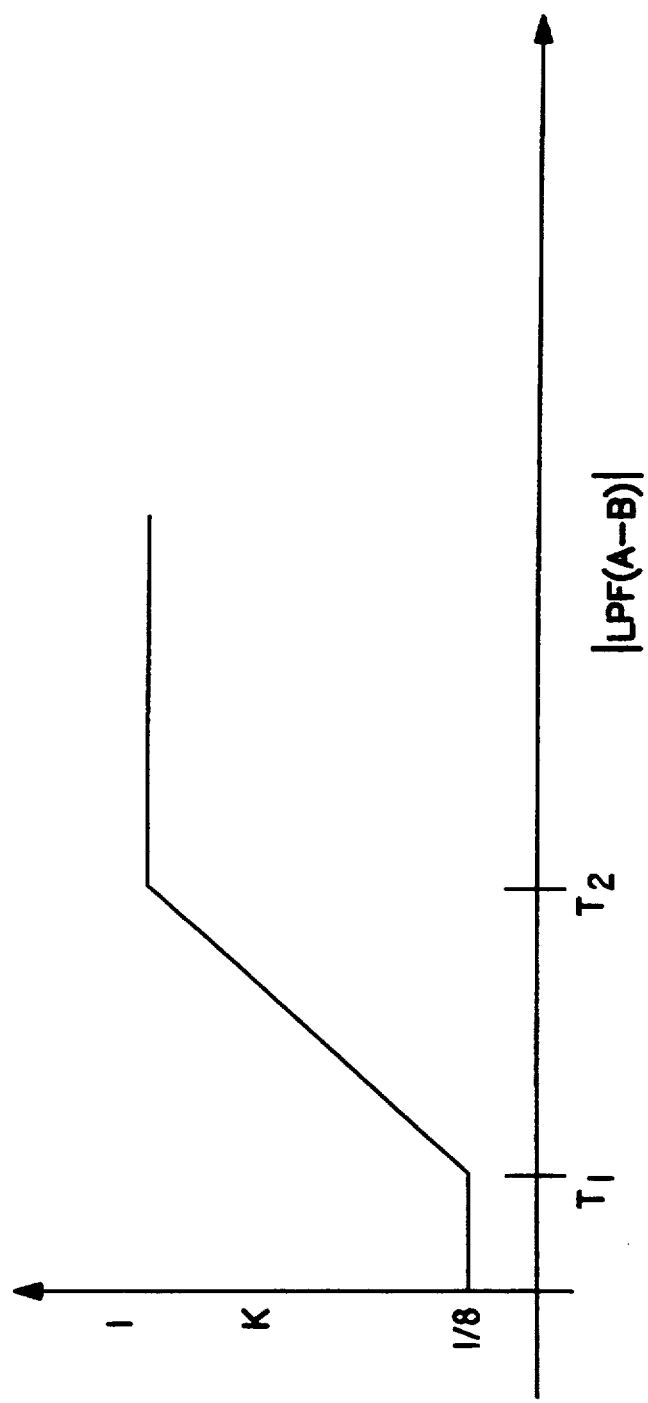
FIG. 2 (prior art) is a graph of attenuation factor versus inter-frame difference which is useful for describing the operation of the processor shown in FIG. 1.

In the drawings, line arrows may represent busses carrying multiple-bit digital signals or connections conveying analog signals or single-bit digital signals. Depending on the processing speed of the devices, compensating delays may be required in certain of the signal paths. One skilled in the art of digital signal processing circuit design will know where such delays are needed in a particular system.

Figure 3:
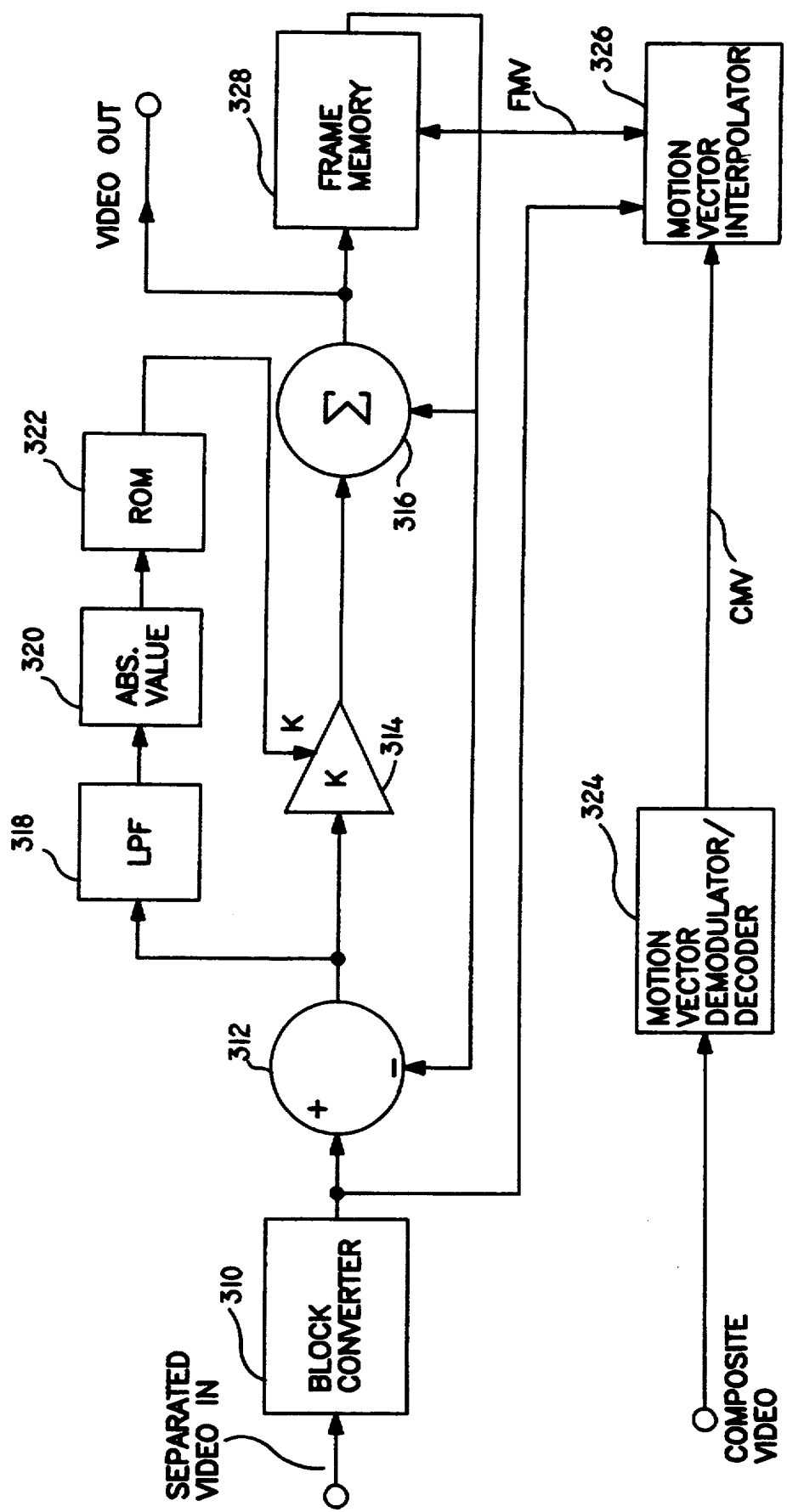
FIG. 3 is a block diagram of a motion-compensated video noise reduction system according to the present invention.

FIG. 3 is a block diagram of an exemplary motion-compensated video noise reduction system in accordance with the present invention. A system of this type may be found, for example, in a consumer television receiver (not shown). In the receiver, the separated video signal is applied to a block converter 310 while either a baseband composite video signal (for the embodiment described with reference to FIGS. 6 and 7) or a modulated video signal (for the embodiment described with reference to FIGS. 10 through 13) is applied a motion vector demodulator/decoder 324. In the exemplary embodiment of the invention, the separated video signal may be a single separated luminance or color difference signal component or a time-division multiplexed (TDM) signal which includes groups of sequential samples representing the luminance signal and both color difference signals.

Block converter 310 converts the received separated video signal from a raster format to block format. In the exemplary embodiments described below, each block includes 64 pixels, eight adjacent pixels from adjacent portions of each of eight successive lines in a frame. Thus, in an exemplary television receiver, the separated video input signal may be derived by apparatus (not shown) which demodulates a composite video signal, separates the luminance and color difference signal components and stores the result in a frame memory (not shown). In this exemplary system, the block converter 310 would extract blocks of pixel values from this frame memory.

The block converter 310 applies these blocks of pixels to an averaging circuit which includes a subtracter 312, low-pass filter 318, rectifier circuit 320, ROM 322, multiplier 314 and summing circuit 316. These circuit elements operate in the same manner as the subtracter 110, low-pass filter 116, rectifier circuit 118, ROM 120, multiplier 112 and summing circuit 114, described above with reference to FIG. 1.

The frame memory 328, however, does not provide blocks at the same sample location as the frame memory 122. The frame memory 122 provides blocks of samples at the same locations as the incoming blocks. Frame memory 328, on the other hand, provides samples at locations indicated by fine motion vectors which are generated, in turn, by a motion vector interpolator 326.

The exemplary motion vector interpolator 326 receives coarse motion vectors (CMV's) from the motion vector demodulator/decoder 324, the current block from the block converter 310 and pixels from the frame memory 328. Each coarse motion vector indicates the position of a group of pixels (i.e. a target block) from the frame memory 328 which match the current block of pixels, as determined by interpolation circuitry (not shown) in the transmitter. As described below, with reference to FIGS. 8a through 8c and 9a through 9c, these coarse motion vectors are encoded in and transmitted with the signal that represents the video image.

The exemplary interpolator 326 compares the current block of samples provided by the block converter 310 to blocks of virtual samples in the frame memory 328 which are offset by fractional pixel locations from the target block-of pixel values indicated by the CMV. These blocks of virtual samples are generated, for example by interpolating among the samples surrounding the target block.

In the two embodiments described below, the motion vector demodulator and decoder extracts the encoded motion vectors from the baseband composite video signal and from the modulated video signal, respectively. It is contemplated that other methods of sending the motion vector data encoded in the video signal may be used instead of or in addition to the methods described below.

As in the embodiment of the invention shown in FIG. 1, blocks of pixels from the current frame are combined, in varying proportions, with the blocks of virtual pixels from the previous frame based on the amount of relative motion which exists between the frames. This motion is measured between the selected block of the current frame and the block of virtual pixel values provided by the frame memory 328. Since these blocks are more likely to match than blocks selected by the system without motion compensation shown in FIG. 1, the amount of noise reduction realized by the system shown in FIG. 3 should be greater than that realized by the system shown in FIG. 1.

Figure 4:
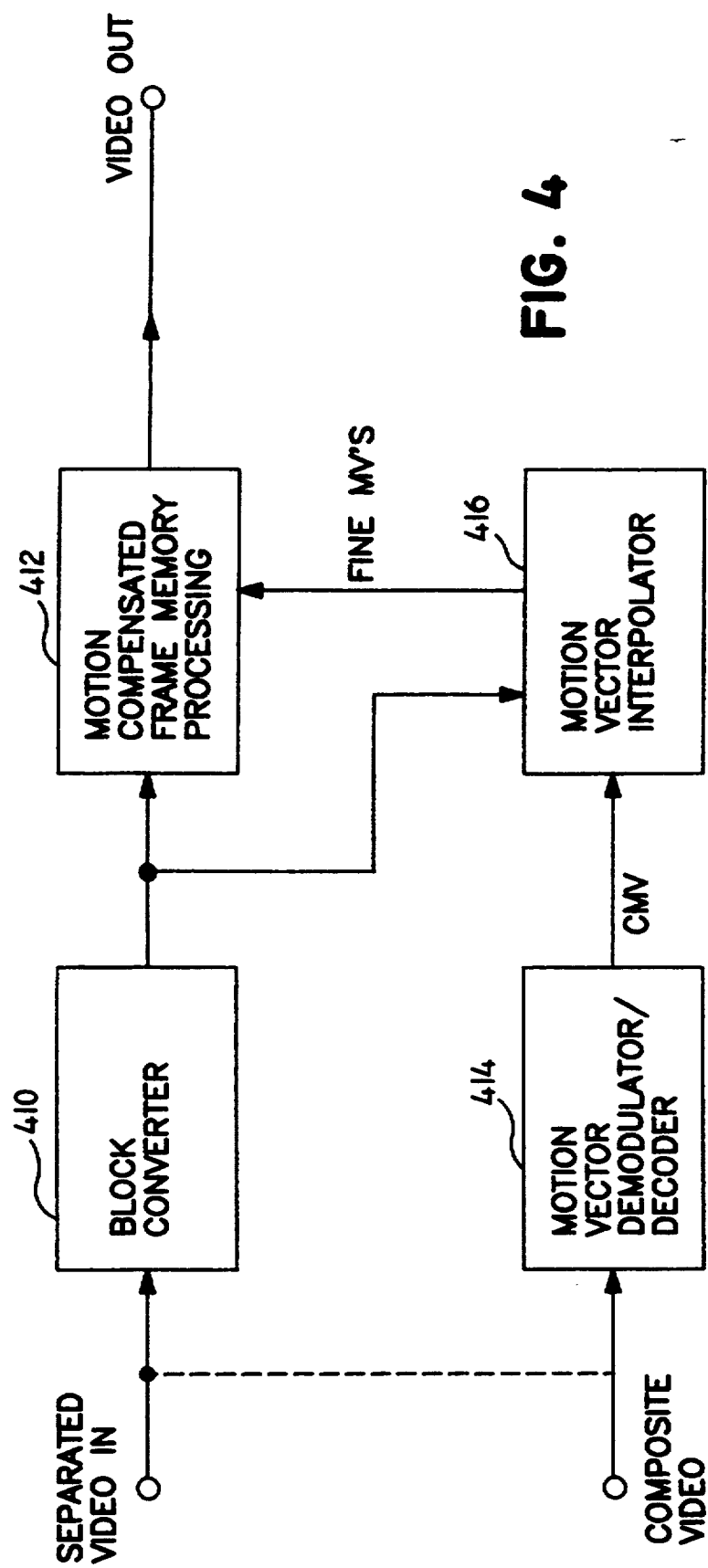
FIG. 4 is a block diagram of a general motion-compensated processor according to the present invention.

The system shown in FIG. 4 generalizes the noise reduction system, described above, to other types of motion-compensated frame processing systems. In this system, the separated video signal is applied to a block converter 410 while an encoded video signal, for example, a baseband or modulated composite video signal, is applied to a motion vector demodulator and decoder 414. As the pixels of the separated video signals are being formed into blocks of N by M pixels, the coarse motion vectors which were determined for the blocks are decoded by the circuitry 414. These coarse motion vectors are converted into fine motion vectors by the motion vector interpolator 416. Finally, the fine motion vectors, indicating the best local match to the current block of pixels from the previous frame, are applied to the motion compensated .frame memory processing circuitry 412. As set forth above, this circuitry may perform noise reduction or interlace to progressive scan conversion. In addition, if the input signals to both the block converter 410 and the motion vector decoder and demodulator 414 are composite video signals, as indicated by the broken line, the circuitry 412 may include a motion-compensated luminance/chrominance separation filter.

The materials presented above with reference to FIGS. 3 and 4 describe how the coarse motion vectors are used once they are received. The circuitry described below with reference to FIGS. 5 through 13 describes two methods by which the coarse motion vectors are generated, encoded with the transmitted video signal and then decoded in a television receiver.

The first of these systems is described with reference to FIGS. 5 through 8c. This system calculates motion vectors for blocks of pixels generated, for example, by a video camera, and encodes these motion vectors with the video signal using Fukinuki-type modulation.

The transmission of auxiliary information in a television signal using a Fukinuki carrier is described in a paper by T. Fukinuki et al. entitled "Extended Definition TV Fully Compatible With Existing Standards", *IEEE Transactions on Communications*, Vol. COM-32, No. 8, August 1984, pp. 948–953, which is hereby incorporated by reference for its teachings on Fukinuki-type modulation. This paper describes an area in the spatio-temporal frequency spectrum of an interlaced color television signal which contains only a relatively small amount of information that can be perceived by the human eye. This region is commonly called the Fukinuki hole.

Fukinuki modulation differs from the standard NTSC chrominance modulation by requiring the Fukinuki subcarrier signals to be 180° out of phase from field to field as well as from frame to frame and line to line. For conventional chrominance signal quadrature modulation, the subcarrier signals are out of phase by 180° from line to line and from frame to frame but not from field to field.

In order to effectively separate the Fukinuki modulated information from the composite video signal, it is desirable for the information on both fields of a given frame to be identical. This is true both for the Fukinuki modulated information and for the chrominance and high-frequency luminance information which occupies the same band of frequencies.

An NTSC video signal image frame is made up of 525 horizontal line intervals. Thus, each field has 262.5 line intervals. Two types of field delays are commonly used in NTSC video signal processing apparatus: a 262 H delay and a 263 H delay. Composite video signals which are delayed by 262 H have the same chrominance subcarrier phase while signals delayed by 263 H have opposite chrominance subcarrier phases.

The Fukinuki modulated information is perceptually hidden in the reproduced television image since it appears as flashes of complementary colors occurring at the frame rate (i.e. 30 Hz for NTSC). These flashes are not correlated with the image and, at worst, appear to be random noise. Psychometric studies have shown that the human eye is relatively insensitive to image distortion of this type since the rapidly flashing complementary colors are integrated into their corresponding base color.

Figure 5:
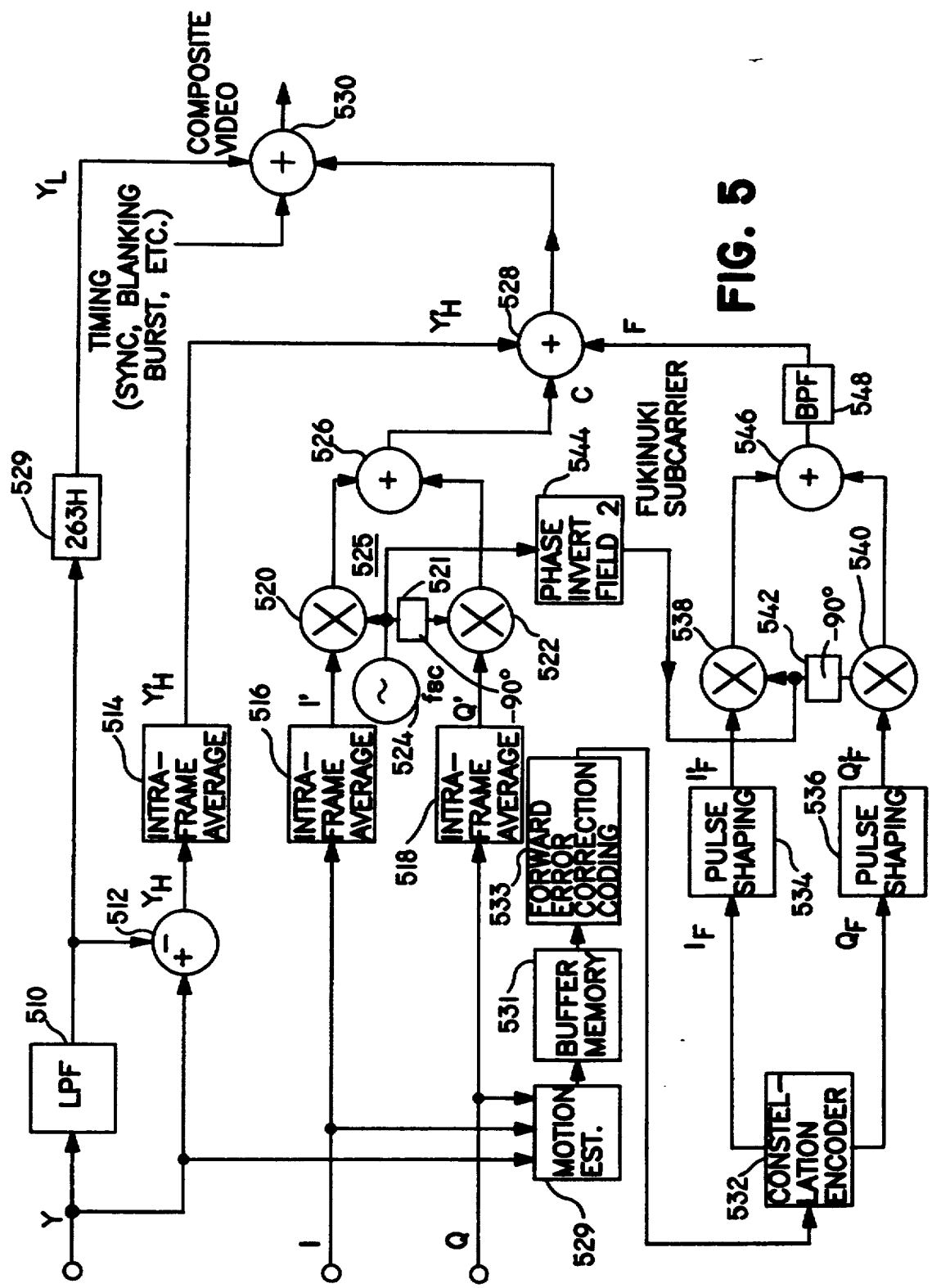
FIG. 5 is a block diagram of a video signal processor and motion vector encoder which is suitable for use with a first embodiment of the invention.

An exemplary embodiment of the invention as would be realized in a television studio is shown in FIG. 5. In this Figure, a luminance signal Y is applied to a low-pass filter 510. The exemplary filter 510 passes luminance information having frequencies less than 2.96 MHz to produce the output signal $Y_L$. This signal is subtracted from the input luminance signal Y by the subtracter 512 to produce a high-pass filtered luminance signal $Y_H$. The signal $Y_H$ and the signals I and Q are processed by respective intraframe averaging circuits 514, 516 and 518. Each of these circuits averages corresponding pixel information from both fields of each frame of the video signal to produce pixel values representing the average of the pixels in each of the two fields.

Figure 5A:
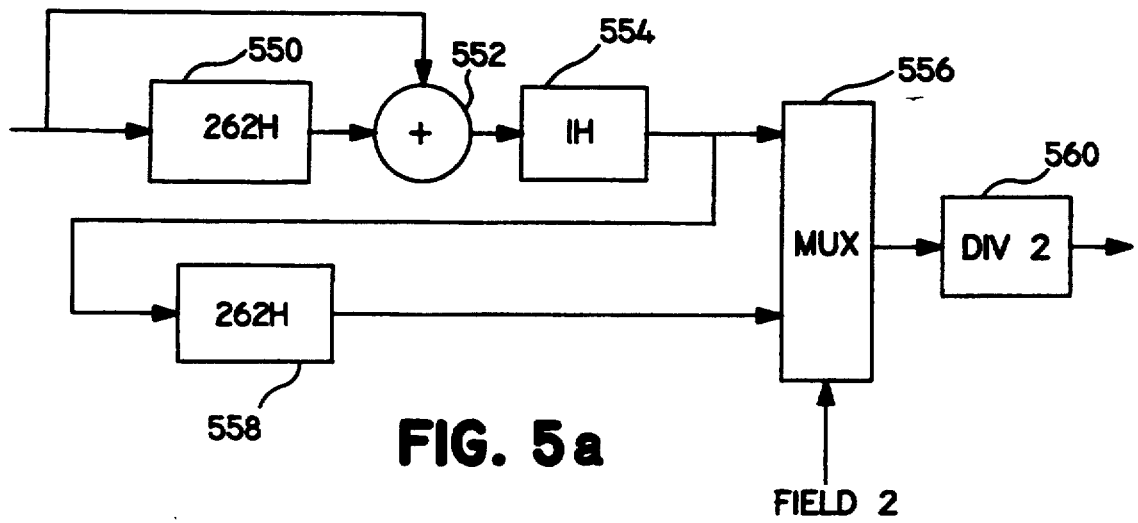
FIG. 5a is a block diagram of an intraframe averager suitable for use with the video signal processor shown in FIG. 5.

An exemplary intraframe averager is shown in FIG. 5a. In this Figure, input samples are applied to a delay element 550 which delays the samples by 262 horizontal line intervals (262H—i.e. one field interval). The output samples provided by the delay element 550 are summed with the input samples by an adder 552. The samples produced by the adder 552 are then applied to a 1H delay element 554. The output samples of the 1H delay element 554 are applied to one signal input port of a multiplexer 556 and to a 262H delay element 558. The other signal input port of the multiplexer 556 is coupled to receive the output samples provided by the 262H delay element 558. The multiplexer 556 is responsive to a control signal, FIELD 2, to provide the output signal of the 1H delay element 554 when field 2 of the input signal is being applied to the intra-frame averaging circuitry and to provide the output signal of the delay element 558 when field 1 is being applied. The output samples produced by the multiplexer 556 are divided by 2 (i.e. shifted to less significant bit positions by 1 bit) by a divider 560. In addition to averaging the 2 fields of each frame of video information, the intraframe averager shown in FIG. 5a delays the video signals by 263 horizontal line intervals (i.e. 263H).

Referring to FIG. 5, the intraframe averaged I and Q color difference signals provided by the circuits 516 and 518 are next applied to a quadrature modulator 525. The exemplary modulator 525 includes two digital multipliers 520 and 522, a source 524 of color subcarrier signal ($F_{sc}$) and a circuit 521 which shifts the phase of the color subcarrier signal by $-90°$. Multiplier 520 multiplies the in-phase carrier signal $F_{sc}$ by the signal I' provided by the intraframe averaging circuit 516 to produce an amplitude modulated output signal. Similarly, multiplier 522 multiplies the quadrature phase related carrier provided by the phase-shift circuit 521 by the Q' color difference signal, provided by the intraframe averaging circuit 518, to produce an amplitude modulated quadrature carrier signal. The output signals of the multipliers 520 and 522 are combined by an adder 526 to produce the modulated chrominance signal C.

The signal C is combined with the luminance high-frequency signal $Y_H'$ provided by the intraframe averaging circuit 514 and with the Fukinuki modulated signal F provided, as described below, by the band-pass filter 548. This combined signal represents the high-frequency components of the composite video signal. It is combined with the low-frequency components of the luminance signal provided by low-pass filter 510 via compensating delay element 529 in an adder 530. As shown in FIG. 5, the timing signals, i.e. the horizontal and vertical synchronization signals, the horizontal and vertical blanking intervals and the color reference burst signal are added to the composite video signal by the adder 530. The signal produced by the adder 530 is a baseband composite video signal.

In a television studio, signals from many different sources are available for transmission. Since it is desirable to combine these signals without abrupt transitions, a common set of timing signals and a common color subcarrier signal are readily available. The signal produced by the adder 530 is synchronized to the other signals to be transmitted using these common signals and the resulting signal is applied to an RF modulator (not shown) and RF amplifiers (not shown) to generate a signal for broadcast.

The circuitry described above generates the video signal information which is normally sent in an NTSC broadcast television signal. In addition, in this embodiment of the invention, digital information describing motion vectors for blocks of pixels in each frame of the video signals is transmitted with the television signal via Fukinuki-type modulation.

Briefly, this added digital information, in the form of bit-serial digital data, is converted into four-bit nibbles which are then encoded using a 16 QAM modulation scheme. This QAM signal is generated using Fukinuki type modulation rather than conventional quadrature amplitude modulation. The Fukinuki modulated signal is then combined with the high-frequency luminance and chrominance components of the composite video signal as described above to generate a composite video signal for transmission.

Figure 6:
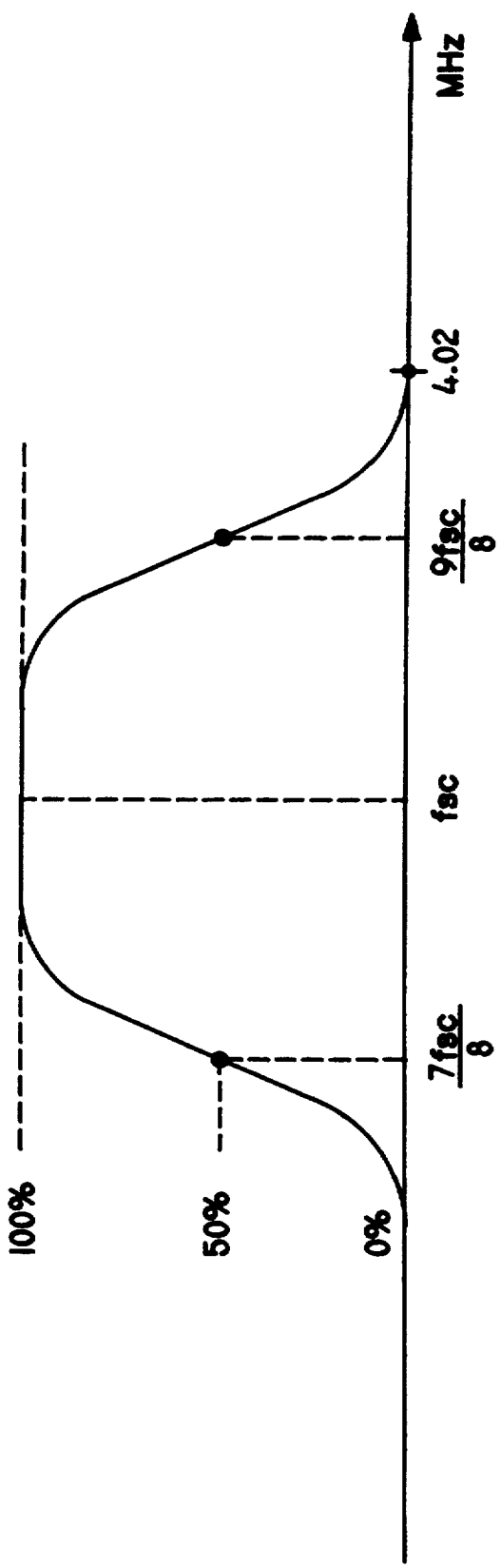
FIG. 6 is a graph of amplitude versus frequency which is useful for describing the operation of the motion vector encoder shown in FIG. 5.

FIG. 6 shows the 16 QAM spectrum occupied by the motion vector data which modulates quadrature phase related Fukinuki carriers having a frequency of $f_{sc}$. The bit rate selected for the data is also $f_{sc}$ so the symbol rate, that is to say, the rate at which four-bit symbols are generated, is $f_{sc}/4$. The Fukinuki modulated data is transmitted only during the active video interval to prevent any interference with synchronization signals or information bearing signals such as teletext or ghost cancellation training signals which may be sent during the horizontal and vertical blanking intervals.

In one video field of an NTSC signal there are 240 active lines each containing 768 pixels, assuming a sampling clock frequency of $4f_{sc}$. Thus, assuming a bit rate of $f_{sc}$, in the active portion of each line there are $768/4=192$ bits. Therefore, in one field interval, we may send 240 * 192 = 46 080 bits of digital data.

Since, as described above, both fields of the Fukinuki modulated information within a frame are desirably identical, this is also the amount of information that can be sent in a frame. If we assume a forward error correction overhead of approximately 25%, the actual data bandwidth that is available for sending motion vector information is 46 080/1.25 = 36 864 bits per frame.

Because NTSC is transmitted on a field basis, it is desirable to send motion vectors on a field basis. Thus, 36 864/2 = 18 432 bits of motion vector data may be assigned to each field in the NTSC image.

Each field contains 768 * 240 active pixels. If the field is partitioned into non-overlaping motion blocks having N pixels per line on each of M lines, then the number of motion blocks in a field, NMB, is given by equation (2).

$$NMB = (768 * 240)/(N * M) \qquad (2)$$

Each motion block can, therefore, be assigned 18 432/NMB bits for its motion vector. If M and N are both 12, then there are 14.4 bits for each motion vector. One method is to assign 14 bits per motion vector, seven bit values each for horizontal and vertical, each value having a six-bit magnitude and a one-bit sign. Using this scheme, motion vectors can be transmitted covering a range of ±64 pixels with 1 pixel (i.e. 70 ns) accuracy or ±32 pixels with 0.5 pixel (35 ns) accuracy.

Figure 8A:
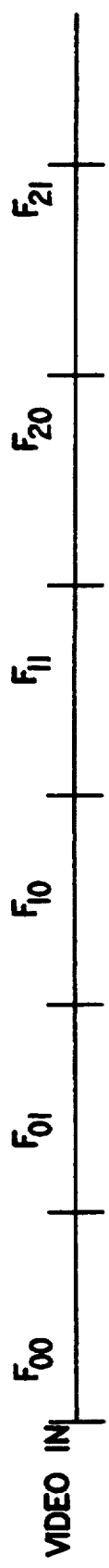
FIGS. 8a, 8b and 8c are timing diagrams which are useful for describing the operation of the motion vector encoder shown in FIG. 5.
Figure 8B:
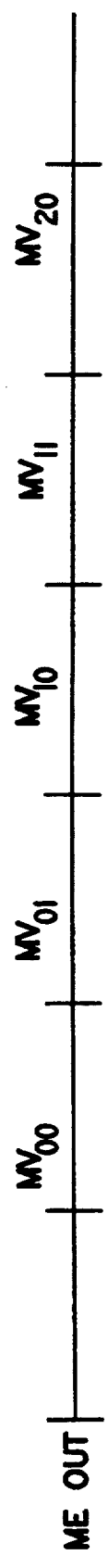
Figure 8C:
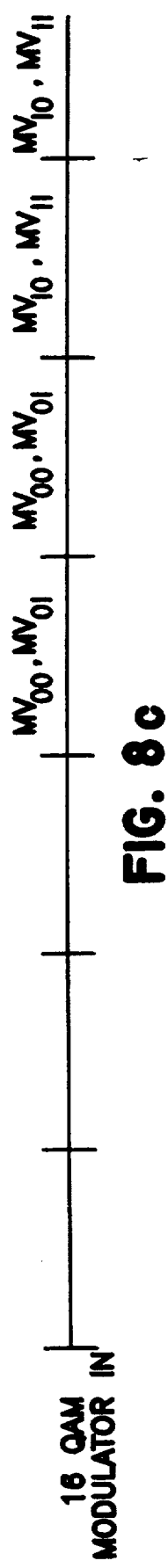

FIGS. 8a, 8b and 8c show exemplary timing for generating motion vectors which are modulated onto a 16 QAM Fukinuki carrier.

Referring FIG. 5, a motion estimator 529 provides motion vectors (FIG. 8b) for each field of the input video signal (FIG. 8a) with a delay of one field. These motion vectors are provided using conventional means. For example, the motion estimator 529 may search a stored frame in pixel locations defined by the selected search range (e.g. ±64 pixels) for a block of 12 by 12 pixels which exhibits the closest match to the current block of pixels from the current field. The determination of which block in the stored frame is closest to the current frame may be made, for example, using a sum of squared differences algorithm over the current 12 by 12 pixel block and each of the trial 12 by 12 pixel blocks from the stored frame. To preserve spatial accuracy, it may be desirable to skip alternate lines in the blocks retrieved from the stored frame.

These motion vectors are buffered (FIG. 8c) in a motion vector frame buffer 531 with enough storage for motion vectors for two fields. Then, during the next frame period, the motion vectors for both fields are read out twice, once during the first field period and once during the second field period. Forward error correction overhead bits are then added by circuitry 533 and the motion vector data is converted into four-bit nibbles and passed to the constellation encoder 532.

In the exemplary embodiment of the invention, the constellation encoder 532 may be a read-only memory (ROM) which holds 16 four-bit values, two bits of each value representing an in-phase signal value and two bits representing a quadrature phase signal value. The four-bit signal provided by the forward error correction coding circuitry 533 is converted into separate data values for the in-phase and quadrature signals $I_F$ and $Q_F$ which are to be used to modulate the Fukinuki carrier.

Figure 5B:
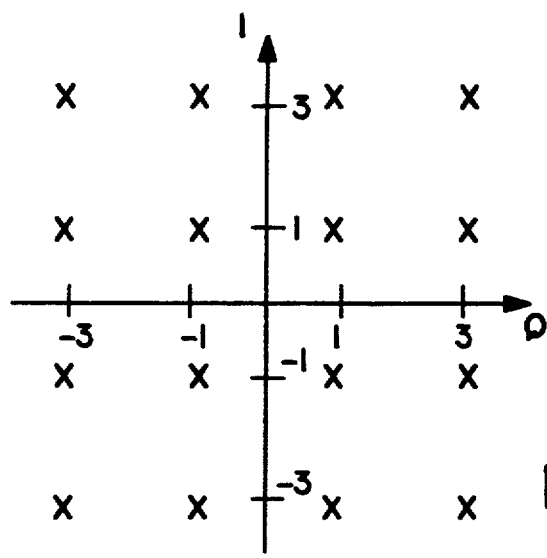
FIG. 5b is a diagram of a constellation suitable for use with the motion vector encoder shown in FIG. 5.

The programming of the ROM 532 is illustrated in FIG. 5b. This Figure is a graphical depiction of a conventional 16 QAM constellation. Each of the X's in the Figure represents a combination of two signal values, one I and one Q, which are used to encode the 16 digital values that may be represented by the four-bit symbols provided by the forward error correction coding circuitry 533. The points in the constellation may be associated in many ways with the digital values. One exemplary association would be to assign the points in the constellation from the upper left corner to the lower right corner to the successive values zero through 15. Whatever allocation scheme is selected, it is desirably implemented both in the transmitter and the receiver.

Thus, the constellation encoder 532 provides a pair of two-bit values, one representing the I coordinate of the constellation point and the other representing the Q coordinate. As shown in FIG. 5b, each of these values may be −1, −3, +1 or +3.

Returning to FIG. 5, the two-bit signals $I_F$ and $Q_F$ produced by the demultiplexing and serial to parallel converter circuitry 532 are applied to respective pulse shaping filters 534 and 536. In the exemplary embodiment of the invention, these filters are finite impulse response (FIR) filters having a raised square root cosine frequency response characteristic with a 3 dB point at $f_{sc}/8$.

A combination of these filters and a similar pair of filters in the receiver, described below with reference to FIG. 7, subject the in-phase and quadrature components of the 16 QAM signal to a net raised cosine frequency response characteristic having a 6 dB point at $f_{sc}/8$ and a rolloff parameter of 0.387. This type of frequency response characteristic is especially advantageous for 16 QAM digital modulation systems as described in a section of a textbook by J. G. Proakis entitled *Digital Communications*, McGraw/Hill, 1989, pp. 532–536, which is hereby incorporated by reference. Using this 16 QAM modulation technique, data values at a symbol rate of $f_{sc}/4$ (894.9 KHz) can be encoded with negligible inter-symbol interference.

The filtered signals $I_F'$ and $Q_F'$ provided by the respective pulse shaping filters 534 and 536 are applied to respective multipliers 538 and 540. Multiplier 538 receives the color subcarrier signal, $F_{sc}$, from source 524 via a selective phase inversion circuit 544. The circuit 544 passes the signal $F_{sc}$ during the first field of each frame and passes an inverted (shifted in phase by 180°) version of the signal $F_{sc}$ during the second field of each frame.

The modulating carrier signal applied to the multiplier 540 is the output signal of the selective phase inversion circuit 544 shifted in phase by −90° by the phase shifter circuit 542. Since the subcarrier signals used in this embodiment of the invention are digital signals having a sample rate of $4f_{sc}$, this phase shift operation may be implemented as a three-sample delay element. The multipliers 538 and 540 produce the in-phase and quadrature phase components of a Fukinuki modulated signal. These components are combined by an adder 546 and applied to a bandpass filter 548. The filter 548 limits the range of frequencies occupied by the Fukinuki modulated signal to 620 KHz on either side of the color sub-carrier frequency, $f_{sc}$. As set forth above, the Fukinuki modulated signal is combined with the other high-frequency components of the composite video signal by the adder 528.

As described above, all of these high-frequency components are identical between the two fields of each frame. In the exemplary embodiment of the invention, the information content of all of the high-frequency components, i.e. the high-frequency luminance signal, $Y_H$, the chrominance signal component C and the Fukinuki modulated signal F are identical on field one and field two of each frame.

While the information on these lines is identical, the signals are not necessarily identical. For the high-frequency luminance and chrominance information, the signals are identical between the two fields. For the high-frequency Fukinuki modulated information, however, the signals on the two fields are opposite in sign. Thus, when the high frequency components of field one are added to the high frequency components of field two, the Fukinuki component is eliminated and all that remains are the high-frequency luminance and chrominance information. If one of these components is subtracted from the other, the high-frequency luminance and chrominance information is lost and all that remains is the Fukinuki modulated information.

This is the basic function performed in the receiver to recover both the television image and the accompanying digital data. FIG. 7 is a block diagram of exemplary circuitry suitable for use in a television receiver. In this circuitry, a digital demodulated composite video signal CV is applied to a low-pass filter 702 and to a subtracter 704. The low-pass filter 702 attenuates all components of the composite video signals having frequencies greater than 2.96 MHz. The output signal provided by the low-pass filter 702 is subtracted from signal CV by the subtracter 704 to produce an output signal which represents the high-frequency components of the composite video signal (i.e. those components having frequencies greater than 2.96 MHz). This output signal is applied to a 262H delay element 706 which delays the signal by one field interval.

The high-pass filtered signal from the subtracter 704 is added to the field delayed signal provided by the delay element 706 in an adder 708. The output signal produced by this adder is a combination of the chrominance signal and high-pass filtered luminance signal; the Fukinuki component has been substantially eliminated by the adder 708. This signal is applied to a 1H delay element 712, the output signal of which is applied in parallel to one signal input port of the multiplexer 716 and to a 262H delay element 714. The output signal of delay element 714 is applied to the other input port of the multiplexer 716. Multiplexer 716 is controlled by the signal FIELD 2 to pass the output signal of the 1H delay element 712 when the second field of each frame is being received and the output signal of the delay element 714 when the first field of the frame is being received.

As described above, the high-frequency luminance and chrominance information is identical for the two fields of each frame. Thus, the output signal produced by the adder 708 is the sum of two copies of the identical information. This is the signal provided by the multiplexer 716. Accordingly, the output terminal of the multiplexer 716 is coupled to a divide-by-two circuit 718. The signal provided by the divide-by-two circuit 718 is the combined high-frequency luminance and chrominance signal components of the input composite video signal.

This signal is applied to a conventional color separation filter/color demodulator 720. This filter which may, for example, include a standard 1H comb filter separates the high frequency luminance signal component $Y_H$ and the two color-difference signal components I and Q from the mixed signal applied to its input port using conventional techniques.

The luminance signal $Y_H$ is applied to one input port of an adder 722. The other input port of the adder 722 is coupled to receive the low-frequency luminance signal $Y_L$ provided by the low-pass filter 702. This signal is delayed by 263H by the delay element 723 to compensate the signal $Y_L$ for processing delays incurred by the signal $Y_H$ through the 262H delay element 706 and 1H delay element 712.

The output signal of the adder 722, Y, is the combined high-frequency and low-frequency luminance signals. This signal and the I and Q color-difference signals provided by the filter and demodulator 720 are the separated video signal which is applied to the block converters 310 and 410 in the respective FIGS. 3 and 4, described above.

To recover the coarse motion vector signal, CMV, the high-pass filtered signal provided by the subtracter 704 and its field-delayed counterpart provided by the 262H delay element 706 are applied to a subtracter 710. This subtracter generates the difference between the field-delayed signal and the high-pass filtered signal provided by the subtracter 704. As set forth above, when the input signals are the first and second fields of an NTSC video frame, this signal is two times the 16 QAM signal which is used to modulate the Fukinuki carrier. This signal is applied to a 1H delay element 726 the output port of which is coupled to one signal input port of a multiplexer 730. The other signal input port of the multiplexer 730 is coupled to receive the same signal, delayed one field interval by a 262H delay element 728.

The multiplexer 730 is conditioned by the control signal FIELD 2 to pass the output signal of the 1H delay 726 while +the second-field of a frame is being received and the output signal of the 262H delay element 728 during the next subsequent field (i.e. the first field of the next frame). Thus, the output signal of the multiplexer 730 is delayed by at least 263H relative to the signal CV. The output signal provided by the multiplexer is divided in amplitude by two by a divide-by-two circuit 732 to generate a signal, F', which is applied to a 16 QAM demodulator 734. This demodulator, which is described below with reference to FIG. 7a, recovers the four-bit digital data from the 16 QAM signal provided the divide-by-two circuit 732.

As described above, the digital information encoded in the two fields of each frame is identical. Thus, circuit 736 processes the digital data to eliminate the redundant data in the second field of each frame and to reformat the data from the four-bit nibbles which were decoded from the 16 QAM signal into 14-bit coarse motion vectors.

Since only the digital data from the first field is passed as valid data, it is contemplated that the 262H delay element and multiplexer 730 may be eliminated without affecting the performance of the digital receiver. In this instance, the data decoded by the 16 QAM demodulator 736 during the second field of each frame is not merely redundant but erroneous since it represents pixel difference values taken between fields of different frames.

Figure 7A:
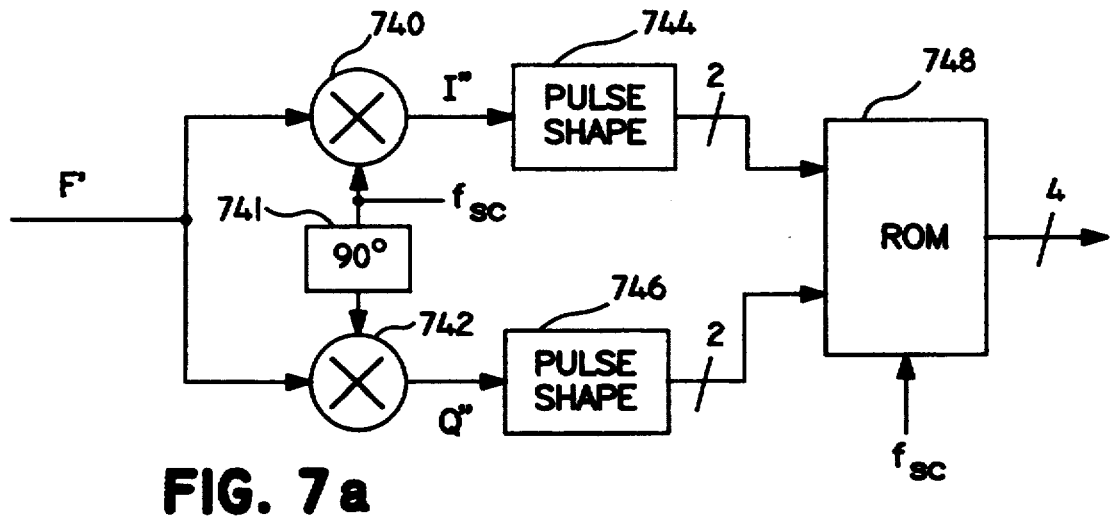
FIG. 7a is a block diagram of a 16-quadrature amplitude modulation (QAM) demodulator suitable for use with the motion vector decoder shown in FIG. 7.
Figure 7:
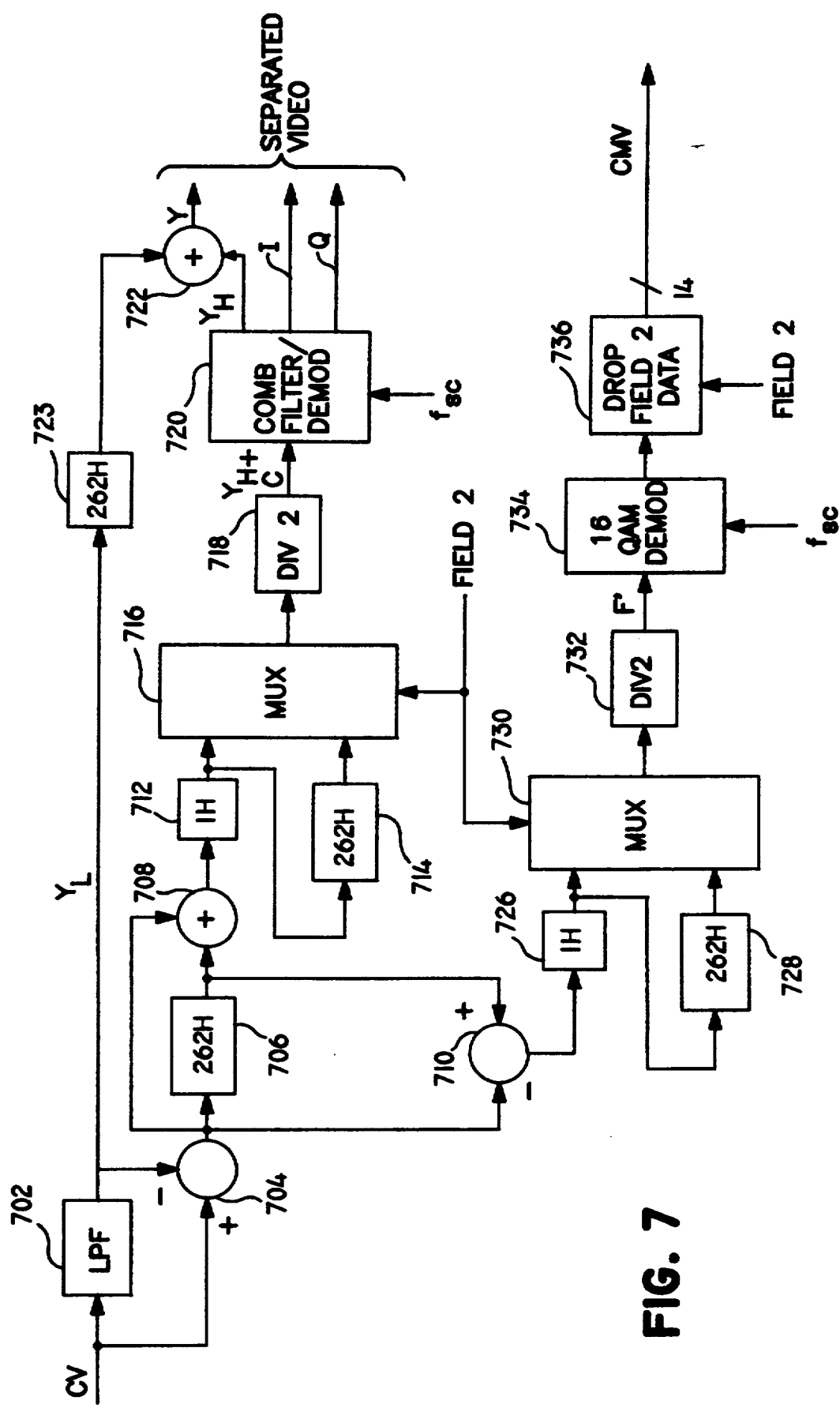
FIG. 7 is a block diagram of a video signal processor and motion vector decoder which is suitable for use with the first embodiment of the invention.

FIG. 7A is a block diagram of an exemplary 16 QAM demodulator suitable for use as the circuit 734, shown in FIG. 7. In this circuit, the signal F' provided by the divide-by-two circuit 732 is applied to two multipliers 740 and 742. The other input port of the multipliers 740 is coupled to receive the color subcarrier signal $F_{sc}'$. Multiplier 742 receives a 90° phase-shifted version of this signal from a phase shifter 741. The multipliers 740 and 742 demodulate the quadrature-modulated information to provide the signals I$f'$ and Q$f'$ which are substantially the same as the signals I$f$ and Q$f$ of FIG. 5. These signals are applied to respective pulse-shaping filters 744 and 746.

As described above, the filters 744 and 746 apply raised square root cosine frequency response characteristics to the respective signals I$f'$ and Q$f'$. The two-bit output signals provided by the filters 744 and 746 are applied to the address input port of a ROM 748. The ROM 748 is responsive to a clock signal having a frequency $f_{sc}$ to load the combined address value at an appropriate time and to reproduce the encoded digital data. While the pulse-shaping filters 744 and 746 may be identical to the filters 534 and 536 of FIG. 5, the ROM 748 is programmed as the inverse of the constellation encoder 532 shown in FIG. 5. Thus, the ROM 748 produces four-bit output signals in response to input values representing points in the 16 QAM constellation shown in FIG. 5b. As described above, these four-bit values are converted into 14 bit motion vectors by the circuitry 736. This circuitry may include, error correction decoding circuitry (not shown) which removes the forward error correction bits that were inserted by the circuitry 533 of FIG. 5, and reformatting circuitry (not shown) which combines successive bits provided by the error correction decoding circuitry to regenerate the 14-bit motion vectors.

An alternative method of conveying motion vector information from a studio to a consumer television receiver is shown in FIGS. 9 through 13. This method encodes the motion vector data using 16 QAM modulation onto a suppressed subcarrier which, in turn, modulates a carrier which is in quadrature with the picture carrier of the modulated television signal.

Figure 9:
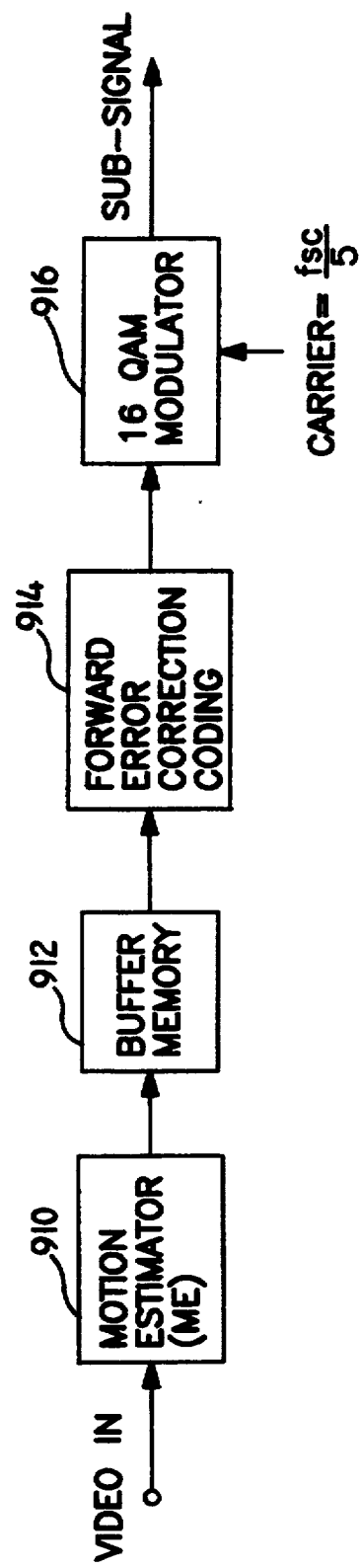
FIG. 9 is a block diagram of a motion vector encoder suitable for use with a second embodiment of the invention.
Figure 9A:
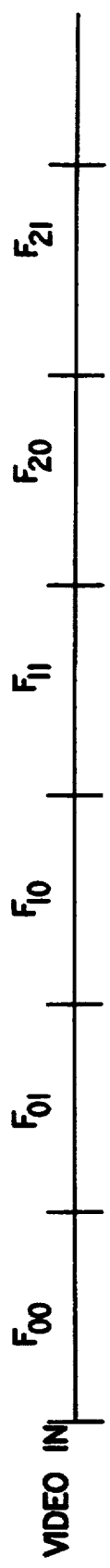
FIGS. 9a, 9b and 9c are timing diagrams which are useful for describing the operation of the motion vector encoder shown in FIG. 9.
Figure 9B:
Figure 9C:
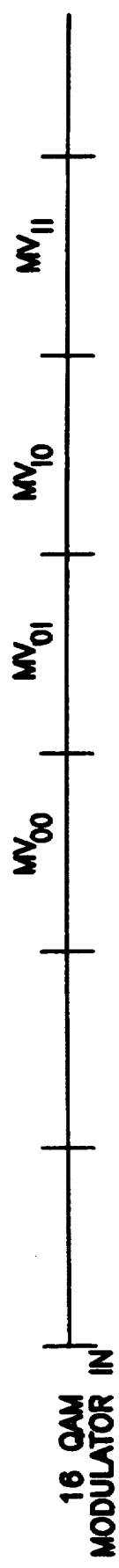

Referring to FIG. 9, the component video signal (FIG. 9a) in the television studio is applied to a motion estimator 910. This estimator may be identical to the motion estimator 529, described above with reference to FIG. 5. As shown in FIG. 9b, the motion estimator 910 produces motion vectors with a delay of one field interval. These motion vectors are applied to forward error correction coding circuitry 914, which may be identical to the circuitry 533, described above. The output signal of the error correction circuitry 914 (FIG. 9c) is applied to a 16 QAM modulator 916. This modulator includes a constellation encoder (not shown) which may be identical to the encoder 532, described above, two pulse shaping filters (not shown), two multipliers (not shown), a 90° phase shift circuit (not shown) and a summing circuit (not shown) which may be similar to the respective pulse shaping circuits 534 and 536, multipliers 538 and 540 and adder 546, described above. Since, in this second embodiment of the invention, ordinary quadrature modulation is used instead of Fukinuki-type modulation, there is no circuitry that is analogous to the phase invert circuit 544.

The only other differences between the 16 QAM modulators shown in FIGS. 5 and 9 are the frequency response characteristic of the pulse shaping filters and the frequency of the QAM carriers. These differences are both illustrated in FIG. 11. As shown in FIG. 11, the 16 QAM carriers have a frequency of $f_{sc}/5$ and the pulse shaping filters in both the studio and the consumer receiver control the frequency spectrum of each of the in-phase and quadrature phase signals to occupy a band of frequencies $f_{sc}/8$ on either side of the $f_{sc}/5$ carrier. The pulse shaping filters used in this QAM modulator and in the corresponding QAM demodulator in the receiver are square-root raised cosine filters which, when combined have a point at $f_{sc}/8$ and a roll off factor of 10%.

The output signal of the 16 QAM modulator 916, shown in FIG. 9, is the signal Sub Signal, which is applied to a multiplier 1012, shown in FIG. 10. The main video signal, including the conventional luminance and chrominance components, in baseband form is applied to another multiplier 1010. The multipliers 1010 and 1012 are coupled to receive respective quadrature-phase related signals at the frequency of the radio frequency (RF) carrier signal which is modulated by the video signal. In FIG. 10, the RF carrier is provided by a signal source 1014 and the quadrature phase carrier is provided by a 90° phase shift circuit 1016.

The output signal of the multiplier 1010 is applied to a vestigal side band (VSB) filter 1018. The filter 1018 limits the lower sideband of the modulated video signal to 1.25 MHz below the RF carrier frequency while allowing the upper sideband to occupy a range of frequencies 6 MHz above the RF carrier frequency. The range of frequencies which may be occupied by this signal is illustrated in FIG. 12a where the RF carrier frequency is represented as PC.

The output signal of the multiplier 1012 is applied to an inverse Nyquist filter. FIG. 12b illustrates the range of frequencies which may be occupied by the signal provided by the multiplier 1012. This is a double sideband signal centered about the frequency, PC, of the RF carrier. FIG. 12c illustrates the effect of applying the signal to the Inverse Nyquist filter frequency response characteristic 1210. In this frequency spectrum, the upper sideband MCMV+¯is reduced in amplitude relative to the lower sideband signal MCMV−.

The output signals of the vestigal sideband filter 1018 and the inverse Nyquist filter 1020 are combined in a summing circuit 1022 to produce a signal having the composite frequency spectrum shown in FIG. 12d. This is the signal which is transmitted from the studio and received at the consumer receiver.

Figure 13:
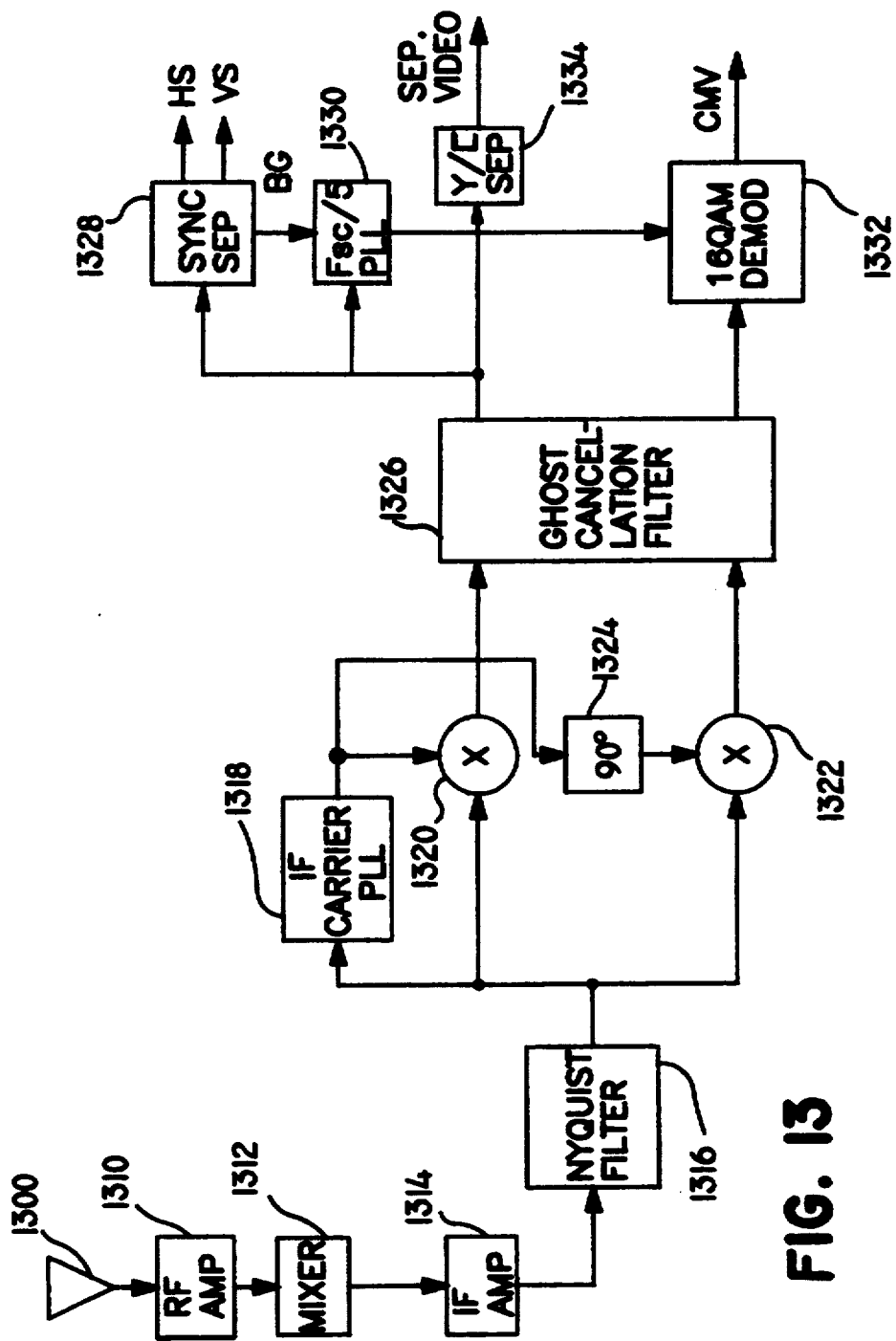
FIG. 13 is a block diagram of a motion vector decoder suitable for use with the second embodiment of the invention.

FIG. 13 is a block diagram of a consumer television receiver which is adapted to receive this television signal. In this receiver, the video signal is supplied by antenna 1300 to an RF amplifier 1310 which amplifies the received signal and passes it to a mixer 1312. The mixer 1312 heterodynes the RF signal with an internally generated oscillatory signal (not shown) to generate a modulated video signal having an intermediate frequency (IF) carrier. This signal is applied to an IF amplifier 1314 which typically includes a Nyquist filter 1316.

FIG. 12e shows the band of frequencies that may be occupied by the signal produced by the Nyquist filter 1316. The frequency axis in this Figure is opposite from the other Figures, increasing to the left, to simplify comparison of the frequency spectra of the transmitted and received signals. As is well known, the heterodyning process performed by the mixer 1312 reflects the frequency components about the IF carrier frequency relative to the RF carrier frequency.

As shown in FIG. 12e, the band of frequencies occupied by the 16 QAM modulated video signals is substantially symmetric about the IF carrier frequency and greatly reduced in amplitude with respect to the information-bearing video signals. This reduction in the amplitude of the quadrature IF carrier reduces the visibility of the modulated digital data in television receivers which do not synchronously demodulate the video signal.

In the television receiver illustrated in FIG. 13, however, the video signal is synchronously demodulated. This is accomplished by applying the signal provided by the Nyquist filter 1316 to an IF carrier phase-locked loop (PLL) 1318 and to two multipliers 1320 and 1322. The PLL 1318 generates a signal at the IF frequency which is locked in phase to the RF carrier that was used to modulate the signal at the studio. This IF carrier signal is applied to the multiplier 1320 directly and to the multiplier 1322 through a 90° phase shift circuit 1324. The output signal of the multiplier 1320 is the in-phase component of the video signal while the output signal of the multiplier 1322 is the quadrature-phase component. These signals are then passed through a ghost cancellation filter 1326, which may, for example, operate in the same manner at the filter described in U.S. Pat. No. 4,864,403 entitled ADAPTIVE TELEVISION GHOST CANCELLATION SYSTEM INCLUDING FILTER CIRCUITRY WITH NON-INTEGER SAMPLE DELAY, which is hereby incorporated by reference for its teaching on the elimination of multipath distortion.

The in-phase component of the ghost cancellation filter 1326 is applied to synchronization signal separation circuitry 1328 which generates horizontal and vertical synchronization signals HS and VS and a burst gate signal, BG, which is applied to an $f_{sc}/5$ PLL 1330. The PLL 1330, which is also coupled to receive the in-phase signal provided by the filter 1326, may be implemented as a $4f_{sc}$ PLL having a frequency divide-by-twenty circuit to generate the $f_{sc}/5$ signal from the $4f_{sc}$ signal.

The output signal of the PLL 1330 and the quadrature output signal of the ghost cancellation filter 1326 are applied to a 16 QAM demodulator 1332. The demodulator 1332 operates in the same manner as the 16 QAM demodulator shown FIG. 7a except that the carrier signal applied to the multipliers (not shown) which correspond to the multipliers 740 and 742 has a frequency of $f_{sc}/5$ instead of $f_{sc}$ and the pulse shape filters (not shown) which correspond to the filters 744 and 746 have a square-root raised cosine frequency response characteristic which matches the frequency response characteristic of the pulse shaping filters (not shown) used in the 16 QAM modulator 916, described above with reference to FIG. 9.

The output signal of the 16 QAM demodulator 1332 is the coarse motion vector signal, CMV, shown in FIGS. 3 and 4. The separated video signal shown in FIGS. 3 and 4 may be generated by applying the in-phase output signal of the ghost cancellation filter 1326 to a conventional luminance/chrominance separation circuit 1334, as shown in FIG. 13.

While the present invention has been described in terms of two exemplary embodiments, it is contemplated that it may be practiced as outlined above within the spirit and scope of the appended claims.

The invention claimed is:

1. Apparatus which aids in the motion processing of a video signal, comprising:

a source of analog video signal having an active image portion representing picture elements of a moving image;

means, coupled to the source for processing the analog video signal to produce a plurality of digital motion vectors indicating a direction of motion of a plurality of areas of the image which exhibit motion from frame to frame;

means for encoding the plurality of digital motion vectors into an analog signal;

means for combining the analog signal representing the encoded motion vectors with the active image portion of the analog video signal during the active video interval while the analog video signal is provided by the source to generate an encoded video signal;

receiver means for receiving the encoded video signal and for regenerating the moving image, said receiver means comprising:

means for separating the encoded motion signal from the encoded video signal;

means for decoding the encoded motion vectors to reproduce the plurality of digital motion vectors;

motion compensated processing means for processing the video signal and the plurality of digital motion vectors to generate a processed video signal; and means for generating a displayed image from the processed video signal.

2. Apparatus for use in the production of television signals, comprising:

a source of analog video signal having an active image portion representing picture elements of a moving image;

means, coupled to the source for processing the video signal to produce a plurality of digital motion vectors indicating a direction of motion for a plurality of areas of the image which exhibit motion from frame to frame.

means for encoding the plurality of digital motion vectors into an analog signal;

means for combining the analog encoded motion vector signal with the active image portion of the video signal during the active video interval while the analog video signal is provided by the source to generate a single encoded video signal; and means for transmitting the encoded video signal to a remote location.

3. Apparatus for use in the production of television signal, comprising:

a source of analog video signal representing a moving image wherein the video signals include luminance and chrominance component signals;

means, coupled to the source for processing the video signal to produce digital motion vectors indicating a direction of motion for areas of the image which exhibit motion from frame to frame.

means for encoding the digital motion vectors into an analog signal including:

a source of first and second quadrature-phase related Fukinuki carrier signals having a frequency within a range of frequencies occupied by the chrominance component of the video signals provided by the source of video signals; and sixteen quadrature amplitude modulation (QAM) means, for modulating both the first and second Fukinuki carrier signals by each of the digital values to generate a Fukinuki modulated sixteen QAM signal representing the encoded digital values as the analog encoded motion vector signal;

means for combining the analog encoded motion vector signal with the video signal provided by the source to generate a single encoded video signal; and means for transmitting the encoded video signal to a remote location.

4. Apparatus for use in the production of television signals, comprising:

a source of analog video signal representing a moving image, wherein the video signals are vestigial sideband modulated on an RF carrier signal having a double sideband modulated portion and a single sideband modulated portion, means, coupled to the source for processing the video signal to produce digital motion vectors indicating a direction of motion for areas of the image which exhibit motion from frame to frame;

means for encoding the digital motion vectors into an analog signal, including:

means for generating a quadrature carrier signal which is quadrature phase related to the RF carrier signal;

means for generating first and second quadrature phase related subcarrier signals having a frequency which is within the range of frequencies occupied by the double sideband portion of the vestigial sideband signal;

sixteen quadrature amplitude modulation (16 QAM) means, for modulating the first and second subcarrier signals by the digital values to generate an analog 16 QAM signal representing the encoded digital values as the encoded motion signal; and means for modulating the quadrature carrier signal with the first and second subcarrier signals to generate the encoded video signal;

means for combining the analog encoded motion vector signal with the video signal provided by the source to generate a single encoded video signal; and means for transmitting the encoded video signal to a remote location.

5. Apparatus which aids in the motion processing of a video signal, comprising:

a source of analog video signal representing a moving image;

means, coupled to the source for processing the analog video signal to produce digital motion vectors indicating a direction of motion for areas of the image which exhibit motion from frame to frame;

means for encoding the digital motion vectors into an analog signal;

means for combining the analog signal representing the encoded motion vectors with the analog video signal provided by the source to generate an encoded video signal;

receiver means for receiving the encoded video signal and for regenerating the moving image, said receiver means comprising:

means for separating the encoded motion signal from the encoded video signal;

means for decoding the encoded motion vectors to reproduce the digital motion vectors;

motion compensated processing means for processing the video signal and the digital motion vectors to generate a processed video signal wherein the motion compensated processing means includes:

means for storing signal values representing a first frame of the analog video signals; and means, responsive to the motion vectors decoded from the analog video signal while a second frame of analog video signals was received, for comparing each of the areas of the image represented by the second frame of video signals with portions of the stored signal values representing corresponding image areas, as indicated by the motion vectors, and surrounding portions of the stored signal values to generate fine motion vectors which indicate the direction of motion of each of the areas of the image represented by the second frame of video signals more accurately than the decoded digital motion vectors; and means for generating a displayed image from the processed video signal.

* * * * *